United States Patent
Luo et al.

(10) Patent No.: US 9,090,720 B2
(45) Date of Patent: Jul. 28, 2015

(54) ALUMINOXANE CATALYST ACTIVATORS CONTAINING CARBOCATION AGENTS, AND USE THEREOF IN POLYOLEFIN CATALYSTS

(75) Inventors: Lubin Luo, Houston, TX (US); Xiao Wu, Baton Rouge, LA (US); Steven P. Diefenbach, Baton Rouge, LA (US)

(73) Assignee: ALBEMARLE CORPORATION, Baton Rouge, LA (US)

( * ) Notice: Subject to any disclaimer, the term of this patent is extended or adjusted under 35 U.S.C. 154(b) by 0 days.

(21) Appl. No.: 14/003,023

(22) PCT Filed: Mar. 8, 2012

(86) PCT No.: PCT/US2012/028188
§ 371 (c)(1),
(2), (4) Date: Sep. 4, 2013

(87) PCT Pub. No.: WO2012/122332
PCT Pub. Date: Sep. 13, 2012

(65) Prior Publication Data
US 2013/0345376 A1    Dec. 26, 2013

Related U.S. Application Data

(60) Provisional application No. 61/450,696, filed on Mar. 9, 2011.

(51) Int. Cl.
| | |
|---|---|
| *C08F 4/02* | (2006.01) |
| *C08F 4/642* | (2006.01) |
| *C08F 4/6592* | (2006.01) |
| *C08F 10/00* | (2006.01) |
| *C08F 110/06* | (2006.01) |
| *C08F 4/659* | (2006.01) |
| *C08F 110/02* | (2006.01) |
| *C08F 210/16* | (2006.01) |

(52) U.S. Cl.
CPC ............ *C08F 110/06* (2013.01); *C08F 4/02* (2013.01); *C08F 4/65912* (2013.01); *C08F 4/65916* (2013.01); *C08F 10/00* (2013.01); *C08F 110/02* (2013.01); *C08F 210/16* (2013.01)

(58) Field of Classification Search
CPC ............... C08F 4/02; C08F 4/60; C08F 4/64; C08F 6/65912; C08F 4/65916; C08F 4/6592
USPC .......... 502/103, 120, 152; 526/129, 160, 165, 526/943
See application file for complete search history.

(56) References Cited

U.S. PATENT DOCUMENTS

| | | | |
|---|---|---|---|
| 6,333,388 B1 | 12/2001 | Kumamoto et al. | |
| 7,084,221 B2 | 8/2006 | Guo et al. | |
| 8,354,485 B2 | 1/2013 | Luo et al. | |
| 2005/0143254 A1 | 6/2005 | Sangokoya et al. | |

OTHER PUBLICATIONS

Eugene You-Xian Chen et al: "Cococatalysts for Metal-Catalyzed Olefin Polymerization: Activators, Activation Processes, and Structure-Activity Relationships", Chemical Reviews, American Chemical Society, US, vol. 100, Jan. 1, 2000, pp. 1391-1434, XP007920121, ISSN: 0009-2665, DOI: 10.1021/CR980462J.

*Primary Examiner* — Caixia Lu
(74) *Attorney, Agent, or Firm* — James A. Jubinsky; Nathan C. Dunn; Marcy M. Hoefling

(57) ABSTRACT

This invention relates to an activator composition comprising (i) an organoaluminum compounds; (ii) a carbocation compound of the formula $R^1(X)_n$; wherein $R^1$ is a hydrocarbyl; n is from 1 to the number of possible substitutions of the hydrocarbyl group and each X is a labile leaving group; and (iii) an aluminoxane. The activator composition may also contain a carrier support. This invention also provides a catalyst composition comprising the activator composition described above and a transition metal component. This invention also provides methods of polymerizing monomer comprising carrying out such polymerization in the presence of one or more catalyst composition according to this invention.

18 Claims, No Drawings

ALUMINOXANE CATALYST ACTIVATORS CONTAINING CARBOCATION AGENTS, AND USE THEREOF IN POLYOLEFIN CATALYSTS

REFERENCE TO RELATED APPLICATIONS

This application is the National Stage of International Patent Application No. PCT/US2012/028188 filed on Mar. 8, 2012, which in turn claims the benefit of U.S. Provisional Patent Application No. 61/450,696, filed on Mar. 9, 2011, the disclosures of which are incorporated herein by reference in their entirety.

BACKGROUND OF THE INVENTION

Partially hydrolyzed aluminum alkyl compounds known as aluminoxanes (AO) are used for activating transition metals for olefin polymerization activity. One such compound, methylaluminoxane (MAO), is a frequently chosen aluminum co-catalystlactivator in the industry. Considerable effort has been devoted to improving the effectiveness of catalyst systems based on use of aluminoxanes or modified aluminoxanes for polymerization of olefins. Representative patents and publications in the field of aluminoxane usage include the following: U.S. Pat. No. 5,324,800 to Welborn et al.; U.S. Pat. No. 4,752,597 to Turner; U.S. Pat. Nos. 4,960,878 and 5,041,584 to Crapo et al.; WO 96102580 to Dall'occo, et al.; EP 0 277 003 and EP 0 277 004 to Turner; Hlatky, Turner, and Eckman, *J. Am. Chem, Soc.,* 1989, III, 2728-2729; Hlatky and Upton, *Macromolecules,* 1996, 29, 8019-8020. U.S. Pat. No. 5,153,157 to Hlatky and Turner; U.S. Pat. No. 5,198,401 to Turner, Hlatky, and Eckman; Brintzinger, et al., *Angew. Chem. Int. Ed. Engl.,* 1995, 34, 1143-1170; and the like. Despite technological advances, many aluminoxane-based polymerization catalyst activators still lack the activation efficiencies needed for commercial applicability, require commercially unacceptably high aluminum loading, are expensive (especially MAO), and have other impediments to commercial implementation.

Lewis base stabilized dialkylalaminium cations derived from non-aluminoxane systems and their activation characteristics are described by Klosin et al in WO 2000/011006 and *Organometallics,* 19 (2000) 4684-4686. Ionic MAO has been isolated from non-ionic regular MAO through the treatment with a bidentate (or chelating) agent, e.g., octamethyltrisiloxane by Sangokoya et al (WO 2003/082879 and WO 2007/005400). Later, through spiking the dimethylaluminum cation THF complex formed through the reaction of trityl tetrakis(pentafluorophenyl)borate with trimethylaluminum (TMA) in tetrahydrofuran (THF) into regular MAO treated with THF, Luo et al identified dimethylaluminum cation THF complex formed in the THF treated MAO (WO 2009/029857 and US 2009/0062492) Furthermore. Luo et al also demonstrated that, through the treatment of a so-called dimethylaluminum cation precursor agent, the number of dimethylaluminum cations in MAO could be significantly increased and therefore the MAO activation efficiency was largely improved (Luo et al in WO 2009/029857 and US 2009/0062492). More recently, through the design of a metallocene with the NMR detectable leaving groups, the dimethylaluminum cation precursor in MAO has been identified as the major active species to activate a metallocene through the extraction of the dimethylaluminum cation precursor from MAO to form the cationic, metallocene leaving group bridging bimetallic complex shown as A in Reaction 1 as an example, which is further converted to a fully alkylated, stable chelating cationic bimetallic complex as B in Reaction 1 (Luo, et al, *Advances in Polyolefins* 2009, Meeting Abstract, Santa Rosa, Calif., 2009). Such fully alkylated, stable chelating cationic bimetallic complexes have long been recognized as the major metallocene derived species formed when a metallocene is activated with MAO, e.g., cationic bimetallic zirconocene species (Babushkin & Brinztinger, *J. Am. Chem. Soc.,* 2002, 124, 12869) and the cationic bimetallic titanocene species (Bryliakov, Talsi, and Bochmann, *Organometallics,* 2004, 23,149).

Dimethylaluminum Cation Preursor

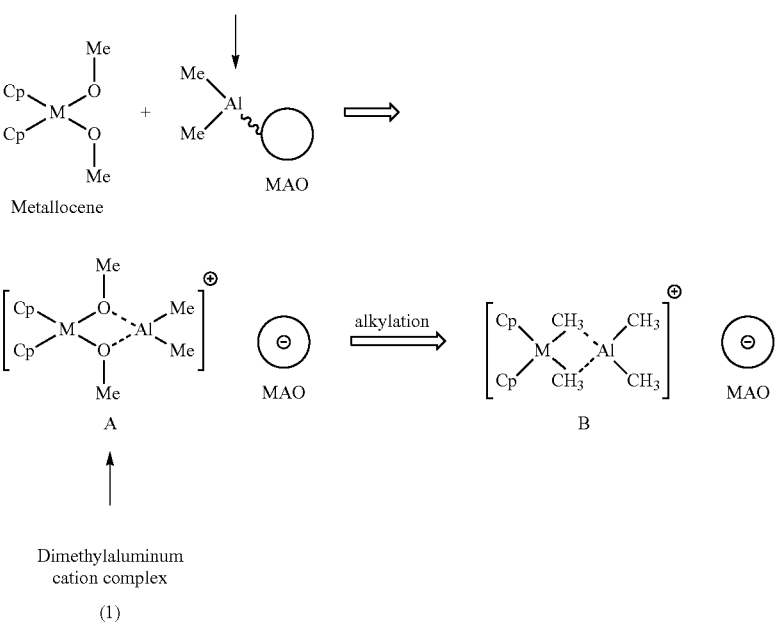

(1)

(M = Ti, Zr, or Hf)

Thus, a need remains for AO-type compositions that exhibit higher efficiencies for activating transition metals for olefin polymerization over conventional AO, in particular, compositions with more active species comprising the dialkylaluminum cation or its precursor in aluminoxane type activators through more economically sound methods to significantly reduce the aluminoxane ratio in a practical catalytic system in order to reduce the cost of making the metallocene/single-site catalysts.

SUMMARY OF THE INVENTION

This invention relates to an activator composition comprising: (i) at least one supported aluminoxane intermediate (Component I), (ii) a compound having the formula $R^1(X)_n$ (Component II); wherein $R^1$ is a hydrocarbyl group having from about 1 to about 20 carbon atoms; n is from 1 to the number of possible substitutions of the hydrocarbyl group and each X may be anywhere on $R^1$ and is independently halogen, $-OSi(R)_3$, $-N(Si(R^2)_3)_2$, $-N(R^2)_2$; $-SR^2$, $-P(R^2)_2$, $-CN$, or $-OR^3$; wherein each $R^2$ is independently hydrogen or a hydrocarbyl group having from about 1 to about 20 carbon atoms; each $R^3$ is independently a hydrocarbyl having from 1 to 20 carbon atoms, wherein when at least one $R^2$ is a hydrocarbyl group, $R^1$ and $R^2$ or $R^1$ and. $R^3$ may be linked together to form a cyclic group; provided that at least one X is not directly bonded to an aryl group; and provided that when X is not halogen, X is bonded to a secondary or tertiary carbon, or a $-CH_2$-aryl group; and (iii) a trihydrocarbylaluminum compound having the formula $AlR_3$ (Component III), wherein each R is independently a $C_1$-$C_{20}$ hydrocarbyl group.

This invention also provides a non-supported activator composition as well as a catalyst composition comprising the activator compositions and a transition metal component. This invention also provides methods of polymerizing monomers comprising carrying out such polymerization in the presence of one or more catalyst compositions according to this invention.

DETAILED DESCRIPTION OF THE INVENTION

This invention relates to an activator composition comprising: (i) at least one supported aluminoxane intermediate (Component I), (ii) a compound having the formula $R^1(X)_n$ (Component II); wherein $R^1$ is a hydrocarbyl group having from about 1 to about 20 carbon atoms; n is from 1 to the number of possible substitutions of the hydrocarbyl group and each X may be anywhere on $R^1$ and is independently halogen, $-OSi(R_2)_3$, $-N(Si(R^2)_3)_2$, $-N(R^2)_2$; $-SR^2$; $-P(R^2)_2$, $-CN$, or $-OR^3$; wherein each $R^2$ is independently hydrogen or a hydrocarbyl group having from about 1 to about 20 carbon atoms; each $R^3$ is independently a hydrocarbyl having from 1 to 20 carbon atoms, wherein when at least one $R^2$ is a hydrocarbyl group, $R^1$ and $R^2$ or $R^1$ and $R^3$ may be linked together to form a cyclic group; provided that at least one X is not directly bonded to an aryl group; and provided that when X is not halogen, X is bonded to a secondary or tertiary carbon, or a $-CH_2$-aryl group; and (iii) a trihydrocarbylaluminum compound having the formula $AlR_3$. (Component III), wherein each R is independently a $C_1$-$C_{20}$ hydrocarbyl group.

This invention also relates to a composition comprising: (i) a trihydrocarbylaluminum compound having the formula $AlR_3$, wherein each R is independently a $C_1$-$C_{20}$ alkyl; (ii) a compound having the formula $R^1(X)_n$; wherein $R^1$ is a hydrocarbyl group having from about 3 to about 20 carbon atoms; n is from 1 to the number of possible substitutions of the hydrocarbyl group and each X may be substituted anywhere on $R^1$ and is independently, $-OSi(R^2)_3$, $-N(Si(R^2)_3)_2$, $-N(R^2)_2$; $-SR^2$; $-P(R^2)_2$; $-CN$, or $-OR^3$; wherein each $R^2$ is independently hydrogen or a hydrocarbyl group having from about 1 to about 20 carbon atoms; each $R^3$ is independently a hydrocarbyl having from 1 to 20 carbon atoms, wherein when at least one $R^2$ is a hydrocarbyl group, $R^1$ and $R^2$ or $R^1$ and $R^3$ may be linked together to form a cyclic group; provided that at least one X is not directly bonded to an aryl group, and provided that X is bonded to a secondary or tertiary carbon, or a $-CH_2$-aryl group; and (iii) an aluminoxane.

The term "hydrocarbyl" as used herein includes a hydrocarbon radical, which may be optionally substituted with a heteroatom (e.g., oxygen, nitrogen, sulfur, phosphorus) or silicon in the chain. Examples of hydrocarbyl include, but are not limited to alkyls, aryls, aralkyls, alkaryls, alkenyls, cycloalkyls, cycloalkenyls, and combinations thereof.

The term "alkyl", as used herein, unless otherwise indicated, includes saturated monovalent hydrocarbon radicals having straight or branched moieties. Examples of alkyl groups include, but are not limited to, methyl, ethyl, propyl, isopropyl, butyl, isobutyl, t-butyl, pentyl and hexyl.

The term "aryl", as used herein, unless otherwise indicated, includes an organic radical derived from an aromatic hydrocarbon by removal of one hydrogen, such as phenyl, naphthyl, indenyl, and fluorenyl. "Aryl" encompasses fused ring groups wherein at least one ring is aromatic.

The term "aralkyl" as used herein indicates an "aryl-alkyl-" group. Non-limiting example of an aralkyl group is benzyl ($C_6H_5CH_2-$) and methylbenzyl ($CH_3C_6H_4CH_2-$).

The term "alkaryl" as used herein indicates an "alkyl-aryl-" group. Non-limiting examples of alkaryl are methylphenyl-, dimethylphenyl-, ethylphenyl- propylphenyl-, isopropylphenyl-, butylphenyl-, isobutylphenyl- and t-butylphenyl-.

The term "alkenyl", as used herein, unless otherwise indicated, includes alkyl moieties having at least one carbon-carbon double bond wherein alkyl is as defined above. Examples of alkenyl include, but are not limited to, ethenyl and propenyl.

The term "cycloalkyl", as used herein, unless otherwise indicated, includes non-aromatic saturated cyclic alkyl moieties wherein alkyl is as defined above. Examples of cycloalkyl include, but are not limited to, cyclopropyl, cyclobutyl, cyclopentyl, cyclohexyl, and cycloheptyl.

The term "cycloalkenyl", as used herein, unless otherwise indicated, includes non-aromatic cyclic alkenyl moieties wherein alkenyl is as defined above. Examples of cycloalkyl include, but are not limited to, cyclopropenyl, cyclobutenyl, cyclopentenyl, cyclohexenyl, and cycloheptenyl.

Unless otherwise indicated, all the foregoing groups derived from hydrocarbons may have up to about 1 to about 20 carbon atoms (e.g., $C_1$-$C_{20}$ alkyl, $C_6$-$C_{20}$ aryl, $C_7$-$C_{20}$ alkaryl, $C_7$-$C_{20}$ aralkyl) or 1 to about 12 carbon atoms (e.g., $C_1$-$C_{12}$ alkyl, $C_6$-$C_{12}$ aryl, $C_7$-$C_{12}$ alkaryl, $C_7$-$C_{12}$ aralkyl), or 1 to about 8 carbon atoms, or 1 to about 6 carbon atoms or 1 to about 4 carbon atoms.

Supported Aluminoxane Intermediates (Component I)

One of the components in the activator composition is a supported aluminoxane intermediate, which is derived from three components: 1) at least one support (or carrier), 2) at least one organoaluminum compound, and 3) at least one oxygen source. The three components can be brought into contact in any order.

Preferably, the organoaluminum compound can be brought into contact with the oxygen source to form a soluble aluminoxane before contacting a support. The formed aluminoxane can contain at least one hydrocarbyl moiety having from one to about twenty carbon atoms. Such aluminoxanes include, but are not limited to, alkylaluminoxanes, cycloalkylaluminoxanes, arylaluminoxanes, aralkylaluminoxanes, or any combination thereof. Hydrocarbylaluminoxanes can exist in the form of linear or cyclic polymers. In one aspect of the invention, the aluminoxanes can be oligomeric materials, sometimes referred to as polyalkylaluminoxanes, containing the repeating unit (C),

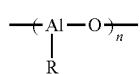

and chain terminal unit (D),

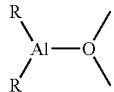

which may also have a coordinated AlR3 to satisfy the four coordination of the aluminum center (D'),

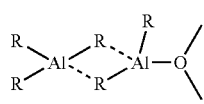

wherein R is a $C_1$-$C_{20}$ hydrocarbyl group and n is an integer from about 4 to about 20. The exact structure of aluminoxanes has not been defined and they can contain linear, cyclic, cross-linked species, or any combination thereof. Non-limiting examples of hydrocarbylaluminoxanes for use in the invention include methylaluminoxanes (MAO), modified MAOs, ethylaluminoxanes (EAO), isobutylaluminoxanes (IBAO), n-propylaluminoxanes, n-octylamluminoxanes, phenylaluminoxanes, or any combination thereof. The hydrocarbylaluminoxanes can also contain up to about 20 mole percent (based on aluminum atoms) of moieties derived from amines, alcohols, ethers, esters, phosphoric and carboxylic acids, thiols, aryl disiloxanes, alkyl disiloxanes, and the like to further improve activity, solubility and/or stability.

Aluminoxanes can be prepared as known in the art by the partial hydrolysis of hydrocarbylaluminum compounds. Hydrocarbylaluminum compounds or mixtures of compounds capable of reacting with water to form an aluminoxane can be employed in the present invention. This includes, for example, trialkylaluminum, triarylaluminum, mixed alkyl-aryl aluminum, or any combination thereof. The hydrocarbylaluminum compounds can be hydrolyzed by adding either free water or water-containing solids, which can be either hydrates or porous materials which have absorbed water. Because it is difficult to control the reaction by adding water, even with vigorous agitation of the mixture, the free water can be added in the form of a solution or a dispersion in an organic solvent. Suitable hydrates include salt hydrates such as, but not limited to, $CuSO_4.5H_2O$, $Al_2(SO_4)_3.18H_2O$, $FeSO_4.7H_2O$, $AlCl_3.6H_2O$, $Al(NO_3)_3.9H_2O$, $MgSO_4.7H_2O$, $MgCl_2.6H_2O$, $ZnSO_4.7H_2O$, $Na_2SO_4.10H_2O$, $Na_3PO_4.12H_2O$, $LiBr.2H_2O$, $LiCl.H_2O$, $LiI.2H_2O$, $LiI.3H_2O$, $KF.2H_2O$, $NaBr.2H_2O$, or any combination thereof. Alkali or alkaline earth metal hydroxide hydrates can also be employed with the present invention. Such alkali or alkaline earth metal hydroxide hydrates include, but are not limited to, $NaOH.H_2O$, $NaOH.2H_2O$, $Ba(OH)_2.8H_2O$, $KOH.2H_2O$, $CsOH.H_2O$, $LiOH.H_2O$, or any combination thereof. Mixtures of salt hydrates and alkali or alkaline earth metal hydroxide hydrates can also be used. The molar ratios of free water or water in the hydrate or in porous materials, which include inorganic oxides such as alumina or silica, to total alkylaluminum compounds in the mixture can vary widely. In one aspect of the present invention such molar ratios are in a range from about 2:1 to about 1:4. In another aspect of the present invention, such molar ratios are in a range from about 4:3 to about 2:7.

In one aspect of the present invention, the aluminoxanes have saturated hydrocarbyl groups (i.e., alkyl or cycloalkyl groups) having from one to about twenty carbon atoms. In another aspect of the present invention, the saturated hydrocarbyl groups of the aluminoxanes have from one to about eight carbon atoms.

Aluminoxones which can be employed in the present invention include, but are not limited to, methylaluminoxane, ethylaluminoxane, n-propylaluminoxane, n-butylaluminoxane, isobutylaluminoxone, n-hexylaluminoxane, n-octylaluminaxane, decylaluminoxane, dodecylaluminoxane, tetradecylaluminoxane, hexadecylaluminoxane, octadecylaluminoxane, phenylaluminoxane, tolylaluminoxane, or any combination thereof.

The aluminoxane can contain up to about 15 mole percent (based on aluminum) of moieties formed from amines, alcohols, ethers, esters, phosphoric and carboxylic acids, thiols, alkyl disiloxanes, and the like to improve their activity, solubility, and/or stability. In another aspect of the present invention, the moiety is a bulky phenol. Suitable bulky phenols include, but are not limited to, 2,6-dimethyl-4-(1,1-dimethylpropyl)phenol, 2,6-diisobutyl-4-methylphenol, 2,6-diisopropylphenol, 2,4,6-triisopropylphenol, 2,6-diisobutylphenol, 2,4,6-triisobutylphenol, 2,6-di-tert-butylphenol, 2,4,6-tri-tert-butylphenol, or any combination thereof.

More preferably, the supported aluminoxane intermediate can be prepared by bringing into contact of the oxygen source and the support before contacting the hydrocarbylaluminum. This includes the use of a support containing an oxygen source, for example, a non-calcined silica that contains physically absorbed water. The amount of oxygen sour on a support can be controlled by either adding a controlled amount of oxygen source to the existing oxygen source on a support, for example, adding water to non-calcined silica, or adding a controlled amount of oxygen source to a support free of oxygen source, for example, adding water to a calcined silica free of physically absorbed water.

Least preferable method is bringing into contact of the support with the organoaluminum compound before contacting the oxygen source.

a) Support (Component I-a)

Supports or carriers useful in compositions according to this invention comprise inorganic carriers or organic carriers. Such carriers may calcined (temperature above 200° C.) such that it does not contain water; or non-calcined or low temperature calcined such that it contains water and particularly, are those in which absorbed water has not been perfectly eliminated. Also, water-containing carriers may be used such that a predetermined amount of water has been added after the absorbed water is completely or incompletely eliminated therefrom. This invention provides that such water-containing carriers can contain up to a percentage of water such that free water is not leaching out of the carrier. As discussed, such water-containing carriers can be either non-calcined or low-temperature calcined. As used herein, a "non-calcined" carrier is a carrier that has not purposely been subjected to calcining treatment, and a "low-temperature calcined" carrier is carrier that has been calcined at a temperature up to less than 200° C., or up to about 100° C., or at about 50° C. The calcination time can be up to about 24 hours. Further, the calcination may be performed in any atmosphere, for example, in an atmosphere of air or an inert gas, or under a vacuum.

Supports containing water that are useful in activator compositions according to this invention comprise inorganic carriers or organic carriers. A plurality of carriers can be used as a mixture, and carriers of this invention may comprise water as absorbed water or in hydrate form. A carrier of this invention may be porous and have a total pore volume of not less than 0.1 ml/g of silica, or not less than 0.3 ml/g. A carrier of this invention may have a total pore volume of about 1.6 ml/g of silica. The average particle diameter of the carrier may be from about 5 micrometers to about 1000 micrometers, or from about 10 micrometers to about 500 micrometers.

One silica useful in this invention is porous and has a surface area in the range of from about 10 $m^2/g$ silica to about 1000 $m^2/g$ silica, including the range of about 10 $m^2/g$ silica to about 700 $m^2/g$ silica, a total pore volume in the range of front about 0.1 cc/g silica to about 4.0 cc/g silica, and an average particle diameter in the range of from about 10 micrometers to about 500 micrometers. A silica useful in this invention can have a surface area in the range of from about 50 $m^2/g$ to about 500 $m^2/g$, a pore volume in the range of from about 0.5 cc/g to about 3.5 cc/g, and an average particle diameter in the range of from about 15 micrometers to about 150 micrometers. Useful silica may have a surface area in the range of from about 200 $m^2/g$ to about 350 $m^2/g$, a pore volume in the range of from about 1.0 cc/g to about 2.0 cc/g, and an average particle diameter in the range of from about 10 micrometers to about 110 micrometers.

An average pore diameter of a typical porous silicon dioxide carrier useful in this invention is in the range of from about 10 angstroms to about 1000 angstroms, or from about 50 angstroms to about 500 angstroms, or from about 175 angstroms to about 350 angstroms. A typical content of hydroxyl groups is from about 2 mmol OH/g silica to about 10 mmol OH/g silica, with or without the presence of hydrogen-bonded water, as determined by the following Grignard reaction. Most of these active OH groups react readily with benzylmagnesium chloride Grignard to produce toluene, and this reaction can be used to quantify the concentration of active OH groups on a particular silica. Alternatively, triethylaluminum can be used for the titration in place of a Grignard reagent. A typical content of hydroxyl groups is from about 2 mmol OH/g silica to about 10 mmol OH/g silica, or about 3 mmol OH/g silica to about 8 mmol OH/g silica, or from about 3.3 mmol OH/g silica to about 7.2 mmol OH/g silica.

Examples of inorganic carriers that may be useful in this invention include inorganic oxides, magnesium compounds, clay minerals and the like. The inorganic oxides can comprise silica, alumina, silica-alumina, magnesia, titania, zirconia, and clays. Examples of inorganic oxides useful in this invention include without limitation, $SiO_2$, $Al_2O_3$, MgO, $ZrO_2$, $TiO_2$, $B_2O_3$, CaO, ZnO, BaO, $ThO_2$ and double oxides thereof, e.g. $SiO_2$—$Al_2O_3$, $SiO_2$—MgO, $SiO_2iO_2$, $SiO_2$—$TiO_2$—MgO. Examples of magnesium compounds useful in this invention include $MgCl_2$, MgCl(OEt) and the like. Examples of clay minerals useful in this invention include kaolin, bentonite, kibushi clay, geyloam clay, allophane, hisingerite, prophylite, talc, micas, montmorillonites, vermiculite, chlorites, palygorskite, kaolinite, nacrite, dickite, halloysite and the like.

Examples of organic carriers that may be useful in this invention include acrylic polymer, styrene polymer, ethylene polymer, propylene polymer and the like. Example acrylic polymers that may be useful in this invention include polymers of acrylic monomers such as acrylonitrile, methyl acrylate, methyl methacrylate, methacrylonitrile and the like, and copolymers of the monomers and crosslinking polymerizable compounds having at least two unsaturated bonds. Example styrene polymers that may be useful in this invention include polymers of styrene monomers such as styrene, vinyltoluene, ethylvinylbenzene and the like, and copolymers of the monomers and crosslinking polymerizable compounds having at least two unsaturated bonds. Example crosslinking polymerizable compound having at least two unsaturated bonds include divinylbenzene, trivinylbenzene, divinyltoluene, divinylketone, diallyl phthalate, diallyl maleate, N,N'-methylenebisactylamide, ethylene glycol dimethacrylate, polyethylene glycol dimethacrylate and the like.

Organic carrier useful in this invention has at least one polar functional group. Examples of suitable polar functional groups include primary amino group, secondary amino group, imino group, amide group, imide group, hydrazide group, amidino group, hydroxyl group, hydroperoxy-group, carboxyl group, formyl group, methyloxycarbonyl group, carbamoyl group, sulfo group, sulfino group, sulfeno group, thiol group, thiocarboxyl group, thioformyl group, pyrrolyl group, imidazolyl group, piperidyl group, indazolyl group and carbazolyl group. When the organic carrier originally has at least one polar functional group, the organic carrier can be used as it is. One or more kinds of polar functional groups can also be introduced by subjecting the organic carrier as a matrix to a suitable chemical treatment.

The chemical treatment may be any method capable of introducing one or more polar functional groups into the organic carrier. For example, it may be a reaction between acrylic polymer and polyalkylenepolyamine such as ethylenediamine, propanediamine, diethylenetriamine tetraethylenepentamine, dipropylenetriamine or the like. As the specific method of such a reaction, for example, there is a method of treating an acrylic polymer (e.g. polyacrylonitrile) in a slurry state in a mixed solution of ethylenediamine and water at 100° C. or more, for example from 120° C. to 150° C. The amount of polar functional group per unit gram in the organic carrier having a polar functional group may be from 0.01 to 50 mmol/g, or from 0.1 to 20 mmol/g.

b) Oxygen Source (Component I-b)

The oxygen source can be provided by water in the carrier. Otherwise, the oxygen source can be any suitable oxygen source, as will be familiar to those skilled in the art given the teaching of this specification. To give some non-limiting examples: the oxygen source can be the free form of water in either the gas phase or the condensed phase (liquid or solid), can be the coordinated form of water such as hydrated metal salts (e.g., $LiOH(H_2O)_n$), water absorbed on compounds containing hydroxy groups, on molecular sieves, and the like, and can be hydroxy or carbonyl containing compounds in which the oxygen atom only directly links to either a tertiary carbon and a hydrogen, for example, $^tBuOH$, $Ph_3COH$, and the like, or a tertiary carbon and an Al after reacting with a trialkylaluminum, for example, PhC(O)Me, PhCOOH, and the like. Depending on the organoaluminum compound in use, the amount of oxygen source can be adjusted so that each of a majority (at least about 50 vol %) of the oxygen atoms therein contacts at least two aluminum atoms. The Al:O ratio can be about 100:1, about 50:1, about 10:1, about 1:1, about 1:1.2, or can be a ratio such that the amount of hydroxy or alkoxy residue does not significantly interact with the active catalyst species generated during methods of this invention. The oxygen source can be provided by water in the carrier. Otherwise, the oxygen source can be any suitable oxygen source, as will be familiar to those skilled in the art given the teaching of this specification. To give some non-limiting examples: the oxygen source can be the free form of water in either the gas phase or the condensed phase (liquid or solid), can be the coordinated form of water such as hydrated metal salts (e.g., LiOH $(H_2O)_n$), water absorbed on compounds containing hydroxy groups, on molecular sieves, and the like, and can be hydroxy or carbonyl containing compounds in which the oxygen atom only directly links to either a tertiary carbon and a hydrogen, for example, $^tBuOH$, $Ph_3COH$, and the like, or a tertiary carbon and an Al after reacting with a trialkylaluminum, for example, PhC(O)Me, PhCOOH, and the like. Depending on the organoaluminum compound in use the amount of oxygen source can be adjusted so that each of a majority (at least about 50 vol %) of the oxygen atoms therein contacts at least two aluminum atoms. The Al:O ratio can be about 100:1, about 50:1, about 10:1, about 1:1, about 1:1.2, or can be a ratio such that the amount of hydroxy or alkoxy residue does not significantly interact with the active catalyst species generated during methods of this invention.

c) Organoaluminum Compound (Component I-c)

The organoaluminum compound useful in this invention can comprise $AlR_n(YR^6)_{(3-n)}$ wherein Al is aluminum; each R is hydrogen or a hydrocarbyl group having up to about 20 carbon atoms, and each R may be the same as, or different from, any other R; for each $YR^6$, Y is a hetero atom and $R^6$ is a hydrocarbyl bonded to the Al through the hetero atom and having up to about 20 carbon atoms; each $YR^6$ may be the same as, or different from, any other $YR^6$; and n is 1, 2, or 3. Each R can be a straight-chain or branched alkyl group. Non-limiting examples of R include alkyl groups having from 1 to about 10 carbon atoms such as methyl, ethyl, n-propyl, isopropyl, n-butyl, isobutyl, n-pentyl, neopentyl and the like.

Non-limiting examples of $AlR_n(YR^6)_{(3-n)}$ useful in this invention include trimethylaluminum, triethylaluminum, triisobutylaluminum, trioctylaluminum, diisobutylaluminum hydride, diethylaluminum hydride, dimethylaluminum hydride, (2,6-di-tert-butyl-4-methylphenoxy)diisobutylaluminum, bis(2,6di-tert-butyl-4-methylphenoxy)isobutylaluminum, (2,6-di-tert-butyl-4-methylphenoxy)diethylaluminum, bis(2,6-di-tert-butyl-4-methylphenoxy)ethylaluminum, (2,6-di-tert-butyl-4-methylphenoxy)dimethylaluminum, or bis(2,6-di-tert-butyl-4-methylphenoxy)methylaluminum, and mixtures thereof. Examples of heteroatoms include nitrogen atom, oxygen atom, phosphorous atom, sulfur atom and the like.

Organoaluminum compounds of this invention can be prepared by any suitable method, including currently known methods, as will be familiar to those skilled in the art, or methods that may come to be known.

Carbocation Precursor $R^1(X)_n$ (Component II)

One of the components in the activator composition is a carbocation precursor agent. Essentially, a carbocation precursor is a compound containing at least one carbon atom directly links to a labile electron rich leaving group X, which readily forms an ion-pair when brought in contact with carrier supported aluminoxane (Component I), with the leaving group X binding to aluminoxane backbone to form the anion and the carbon directly linking to the leaving group X to become a carbocation. Because a silicon atom has similar chemical properties to a carbon atom in terms of cation formation nature although the derived silyl cation is less stable, the carbocation precursor thus also includes a silyl cation precursor that contains a silicon atom directly links to a labile electron rich leaving group X, which readily forms an ion-pair containing a silyl cation when brought in contact with the aluminoxane. Compounds that may be used as a carbocation precursor are those having the formula $R^1(X)_n$; wherein each X may be anywhere on $R^1$ and is independently halogen (fluorine, chlorine, or bromine, preferably fluorine), $-OSi(R^2)_3$, $-N(Si(R^2)_3)_2$, $-N(R^2)_2$; $-SR^2$, $-P(R^2)_2$, $-CN$, or $-OR^3$; wherein each $R^2$ is independently hydrogen or a hydrocarbyl group having from about 1 to about 20 carbon atoms; each $R^3$ independently a hydrocarbyl having from 1 to 20 carbon atoms, wherein when at least one $R^2$ is a hydrocarbyl group; $R^1$ and $R^2$ or $R^1$ and $R^3$ may be linked together to form a cyclic group; $R^1$ is a hydrocarbyl group having from about 1 (when X is halogen) or about 3 (when X is not halogen) to about 20 carbon atoms; n is from 1 to the number of possible substitutions of the hydrocarbyl group; provided that at least one X is not directly bonded to an aryl group, and provided that when X is not halogen, X is bonded to a secondary or tertiary carbon, or a $-CH_2$-aryl group on $R^1$.

The "aryl" proviso disclosed above is for the situation when the labile electron rich leaving group "X" is bounded directly to an aryl group. It has been observed that X in this situation is non-labile, i.e., such groups remain bound to the aryl group when brought into contact with the supported or non-supported aluminoxane and/or organoaluminum compounds. Preferably when $R^1$ comprises an aryl group, $R^1$ is an aralkyl group such that at least one X is bound to the alkyl group (i.e., aryl-alkyl-X, e.g., $PhCH_2$—X), thereby containing at least one labile leaving group. Also the "secondary or tertiary carbon" proviso disclosed above is for situation when the labile electron rich leaving group "X" is not a halogen and bounded to a primary alkyl group. It has also been observed that X in this situation is non-labile, i.e., such groups remain bound to the primary alkyl group when brought into contact with the supported or non-supported aluminoxane and/or organoaluminum compounds. For example, when X contains oxygen and $R^1$ is a primary alkyl, such as diethyl ether (R1=Et and X=OEt) or tetrahydrofuran (THF) ($R^{11}$=$-^{CH}_2CH_2$—, and X=$OR^3$=$-OCH_2CH_2$— and $R^1$ and $R^3$ are linked to form a cyclic group), they remain as a solvent when mixing with a supported or non-supported MAO.

In one embodiment, n is 1, 2, 3, 4, 5 or 6. In another embodiment, $R^1$ is a $C_1$-$C_8$ alkyl or $C_7$-$C_{15}$ aralkyl. In another embodiment, X is $-OR^2$, and $R^2$ is a $C_1$-$C_4$ alkyl or $C_6$-$C_{15}$ aralkyl.

In one embodiment, $R^1(X)_n$ is $(R^4_3C$—$OR^5$ or $(R^4)_3C$—N $(R^5)_2$; wherein each $R^4$ is independently a hydrogen or a hydrocarbyl group having from about to about 20 carbon atoms; $R^5$ is a hydrocarbyl group having from about 1 to about 20 carbon atoms; or $R^4$ and $R^5$ may be linked together to form a cyclic group. Preferably, $R^4$ is independently a $C_1$-$C_{18}$ group, and more preferably $(R^4)_3C$ is independently tert-butyl or trityl, and $R^5$ a $C_1$-$C_6$ alky group.

When X is halogen in $R^1(X)_n$, $R^1$ can be a primary, secondary or tertiary hydrocarbyl group; and when X is a non-halogen group, $R^1$ is preferably a tertiary hydrocarbyl group or a saturated carbon separated aromatic group, and less preferably a secondary hydrocarbyl group, but no a primary hydrocarbyl group. The definitions of primary, secondary, and tertiary hydrocarbyl groups are as follows: a primary hydrocarbyl group represents a $-CH_2R$ group (e.g., ethyl —CH$_2$CH$_3$ or propyl —CH$_2$CH$_2$CH$_3$), a secondary hydrocarbyl group represents a —CH(R)$_2$ group (e.g., isopropyl —CH(Me)$_2$ or sec-butyl —CH(Me)CH$_2$CH$_3$) and a tertiary hydrocarbyl group represents a —CR$_3$ group (e.g., tert-butyl —CMe$_3$ or trityl CPh$_3$), where R is a hydrocarbyl contains at least one carbon. A saturated carbon separated aromatic group represents a —CH$_2$Ar group, where Ar is an aromatic group (e.g., benzyl-CH$_2$Ph), Non-limiting examples of R$_1$(X)$_n$ are: when X=F, fluoromethane CH$_3$F, fluoroethane CH$_3$CH$_2$F, tert-butyl fluoride Me$_3$CF, trityl fluoride Ph$_3$CF, trimethylsilylfluoride Me$_3$SiF, α-fluorotoluene C$_6$H$_5$CH$_2$F, α,α-difluorotoluene C$_6$H$_5$CHF$_2$, α,α,α-trifluorotoluene CF$_3$Ph, 1,3-bis(trifluoromethyl)benzene 1,3-(CF$_3$)$_2$Ph, and the like; when X=O, isopropylmethyl ether Me$_2$CHOMe, tert-butylmethyl ether Me$_3$COMe, tritylmethyl ether Ph$_3$COMe, butenoxide CH$_2$OCHCH$_2$CH$_3$, 1,2-di-tert-butylbenzene 1,2-($^t$BuO)$_2$C$_6$H$_4$, 1,3-di-tert-butylbenezene, 1,3-($^t$BuO)$_2$C$_6$H$_4$, 1,4-($^t$BuO)$_2$c$_6$H$_4$; $^t$BuO—CH$_2$—CH$_2$—O-$^t$Bu, isobutene oxide CH$_2$OCMe$_2$, 2,3-dimethoxyl-2,3-dimethylbutane Me$_2$C(OMe)C(OMe)Me$_2$, 2,3-dimethoxylbutane MeCH(OMe)CH(OMe)Me; tert-butyltrimethylsilyl ether Me$_3$COSiMe$_3$, 1-methyl-tetrahydrofuran, 1,2-dimethyl-tetrahydrofuran and the like, and when X=N, triisopropylamine (Me$_2$CH)$_3$N, tert-butyldimethyl amine Me$_3$CNMe$_2$, tritylmethyldimethyl amine Ph$_3$CNMe$_2$, 2,3-bis(dimethylamino)-2,3-dimethylbutane Me$_2$C(NMe$_2$)C(NMe$_2$)Me$_2$, 2,3-bis(dimethylamino)butane MeCH(NMe$_2$)CH(NMe$_2$)Me; tert-butyltrimethylsilyl ether Me$_3$COSiMe$_3$, N,N-dimethylbenzylamine and the like, and when X=O and N on a saturated carbon separated aromatic group, benzylmethyl ether MeOCH$_2$Ph, benzyldimethylamine Me$_2$NCH$_2$Ph and the like, wherein C$_6$H$_4$ is a phenylene group and $^t$Bu is a tertiary-butyl group.

Non-limiting examples of R$^1$(X)$_n$ are Me$_3$CF, Me$_3$SiF, C$_6$H$_5$CH$_2$F, C$_6$H$_5$CF$_3$ 1,3-C$_6$H$_4$(CF$_3$)$_2$, 1,2-($^t$BuO)$_2$C$_6$H$_4$; 1,3-($^t$BuO)$_2$C$_6$H$_4$, 1,4-($^t$BuO)$_2$C$_6$H$_4$; $^t$BuO—CH$_2$—CH$_2$O$^t$Bu; or mixtures thereof, wherein C$_6$H$_4$ is a phenylene group and $^t$Bu is a tertiary-butyl group.

Other non-limiting examples of R$^1$(X)$_n$ are tertiary-butyl methyl ether, tertiary-butyl ethyl ether, tertiary-butyl propyl ether, tertiary-butyl butyl ether, 1-tert-butoxy-2,6-di-tert-butylbenzene, 1-trimethylsiloxy-2,6-di-tert-butylbenzene, trimethylsiloxybenzene, trimethylmethoxysilane, benzylmethyl ether, benzyl ethyl ether, benzylpropyl ether, benzyl butyl ether or mixtures thereof.

Still other non-limiting examples of R$^1$(X)$_n$ are propylene oxide, isobutene oxide, 1-butene oxide, styrene oxide, 4-methyl-styrene oxide, trimethylene oxide, 2,2-dimethyl-trimethylene oxide, 2,2-diphenyl-trimethylene oxide, 1-methyl-tetrahydrofuran, 1,1-dimethyl-tetrahydrofuran, 1-methyl-ethyleneimine, 1,1,2-trimethylethylenimine, 1,1-diphenyl-2-methyl-ethylenimine, 1-methyl-tetrahydro-pyrrole, 1,1-dimethyl-tetrahydro-pyrrole, 1,1-diphenyl-2-methyl-tetrahydro-pyrrole, 1-methyl-piperidine, 1,1-dimethyl-piperidine, 1,1-diphenyl-2-methyl-piperidine, or mixtures thereof.

Preferred examples of R$^1$(X)$_n$ are: CF$_3$C$_6$H$_5$, isobutene oxide, and N,N-dimethylbenzylamine.

Trihydrocarbylaluminum Compound (Component III)

One of the components in the supported aluminoxane-based activator composition is a trihydrocarbylalumimun compound having the formula AlR$_3$, wherein Al is aluminum and each R is independently a C$_1$-C$_{20}$ hydrocarbyl group. Non-limiting examples of R include alkyl groups having from 1 to about 10 carbon atoms such as methyl, ethyl, n-propyl, isopropyl, n-butyl, isobutyl, n-pentyl, neopentyl, benzyl, substituted benzyl and the like. Preferably, the trihydrocarbylaluminum compound is beta-proton free. Non-limiting examples of AlR$_3$ useful in this invention include, but is not limited to: trimethylaluminum, triethylaluminum, tripropylaluminum, tributyaluminum, triisobutylaluminum. tri-n-octylaluminum, trineopentylaluminum, tribenzylaluminum, tris (2,6-dimethylbenzyl)aluminum, or mixtures thereof, preferably, trimethylaluminum (AlMe$_3$), trineopentylaluminum (Al(CH$_2$C(Me$_3$)$_3$)$_3$), and tribenzylaluminum (Al(CH$_2$C$_6$H$_5$)$_3$).

Trihydrocarbylaluminum compounds of this invention can be prepared by any suitable method, including currently known methods, as will be familiar to those skilled in the art, or methods that may come to be known.

Preparation of Compositions of this Invention

Supported activator compositions according to this invention can be prepared by combining the organoaluminum compound, the carbocation precursor agent and the supported aluminoxane intermediate. The three components may be combined in any order, but preferably, the trihydrocarbylaluminum (Component III) is first combined with the supported aluminoxane intermediate (Component I) and then the carbocation agent (Component II) is introduced.

Preferably, the supported aluminoxane intermediate (Component I) may be formed by adding an aluminoxane compound formed through the contact of the oxygen source (Component I-b) and the organoaluminum compound (Component I-c) to the support (Component I-a), such as contacting a calcined silica free of physically absorbed water with methylaluminoxane formed through the reaction of water and trimethylaluminum. The supported activator composition of this invention can then be form by combining at least a portion of the supported aluminoxane intermediate with the trihydrocarbylaluminum compound (Component III) and then the carbocation agent (Component II).

More preferably, the supported aluminoxane intermediate (Component I) may be formed "in-situ" by adding an organoaluminum compound (Component I-c) on the oxygen source (Component I-b) containing support (Component I-a), such as water physically absorbed on silica. The supported activator composition of this invention can then be form by combining at least a portion of the supported aluminoxane intermediate with the trihydrocarbylaluminum compound (Component III) and then the carbocation agent (Component II). The oxygen source that originally exists on the support may be supplemented with additional oxygen sources to allow the reaction with more organoaluminum compound to increase the Al loadings on the supported aluminoxane intermediates. For example, a non-calcined silica with 5-6% water can be saturated with more water to reach 10-12% in order to increase the Al loadings from about 7% to about 14%. Another example is adding a desired amount of water to physically absorbed water free silica (e.g., silica calcined at 600° C.) to control the desired Al loadings.

An alternative route to form the supported aluminoxane intermediate (Component I) "in-situ" is adding excess organoaluminum compound on the oxygen source (Component I-b) containing support (Component I-a) when a trihydrocarbylaluminum compound is used as the organoaluminum compound. The excess organoaluminum compound now serves as both Component I-c and Component III. The activator composition of this invention is then formed by combining at least a portion of the intermediate composition with the carbocation agent (Component II).

Still another alternative route to form the supported aluminoxane intermediate (Component I) when a trihydrocarbylaluminum compound is used as the organoaluminum compound is adding an high trihydrocarbylaluminum containing aluminoxane to the support (Component I-a). The high trihydrocarbylaluminum containing aluminoxane is made from a low oxygen source content (Component I-b) that allows a desired amount of free trihydrocarbylaluminum compound as Component III present in the aluminoxane. Then, at least a portion of the intermediate composition with the present of trihydrocarbylaluminum as Component III can be combined with the carbocation agent (Component II) to form the activator composition of this invention.

The combining can be conducted in an inert gas atmosphere; at a temperature from about −80° C. to about 200° C., or from about 0° C. to about 150° C.; the combining time can be from about 1 minute to about 36 hours, or from about 10 minutes to about 24 hours. Example treatments after completion of the combining operation include filtration of supernatant, followed by washing with inert solvent and evaporation of solvent under reduced pressure or in inert gas flow, but these treatments are not required. Resulting activator composition can be used for polymerization in any suitable state, including fluid, dry, or semi-dry powder, and may be used for polymerization in the state of being suspended in inert solvent. The combining of the components may be conducted at ambient temperature and at a combining time of from about 15 minutes to about 48 hours, or from about 15 minutes to about 6 hours; the resulting combination can be used as is or subsequently heated to a temperature of about 80° C. to about 150° C.

In the supported aluminoxane situation, the mole ratio of the carbocation agent compound of formula $R^1(X)_n$ to the trihydrocarbylaluminum compound $AlR_3$ is about 0.01:1 to 2:1 or about 0.1:1 to about 1.5:1 or about 0.9;1 to 1.1:1, and ideally, 1:1; the mole ratio of X to Al for the compound of formula $R^1(X)_n$ and the supported aluminoxane is about 0.01:1 to 0.8:1 or about 0.03:1 to 0.5:1 or about 0.1:1. The Al mole ratio for trihydrocarbylaluminum to supported aluminoxane is about 0.01:1 to 0.8:1 or about 0.03:1 to 0.5:1 or about 01:1. If the AO is generated in-situ on a support by the reaction of the organoaluminum compound with the oxygen source on the carrier, e.g., the absorbed or added water on silica, the organoaluminum compound can be charged as the sum of two portions, one portion as the trihydrocarbylaluminum component (Component III), a stoichiometric portion for reaction with $R^1(X)_n$ described above, plus the other portion as the organoaluminum compound (Component I-c) for in-situ formation of the aluminoxane on the support.

In the non-supported solution aluminoxane situation, the mole ratio of the carbocation agent compound of formula $R^1(X)_n$ to the trihydrocarbylaluminum compound $AlR_3$ is about 0.01:1 to 0.1:1 or about 0.05:1 to about 0.08:1 or about 1:1; The mole ratio of X to Al for the compound of formula $R^1(X)_n$ and the non-supported solution aluminoxane is about 0.01:1 to 0.15:1 or about 0.03:1 to 0.08:1 or ideally 0.04:1. The Al mole ratio for trihydrocarbylaluminum to non-supported solution aluminoxane is about 0.01:1 to 0.15:1 or about 0.03:1 to 0.08:1 or about 0.04:1.

The amount of aluminum atom in the product activator composition when a catalyst precursor is present, e.g., solid component, obtained by combining the support with the aluminum components can be not less than about 0.1 mmol aluminum atom, or not less than about 1 mmol aluminum atom, in 1 g of the solid component in the dry state.

Catalysts for Olefin Polymerization

Activator compositions of this invention are useful in catalysts for olefin polymerization. Activator composition according to this invention and transition metal component may each be added independently, yet substantially simultaneously, to monomer to catalyze polymerization. Activator composition and transition metal component may be combined to form product and at least a portion of product may be added to monomer to catalyze polymerization. The Al:transition metal ratio can be about 1:1 to about 1000:1, e.g., can be about 100:1 to about 500:1 or about 200:1 to 300:1

Catalysts for Olefin Polymerization—Transition Metal Component

Transition metal component can comprise any transition metal component having olefin polymerization potential. For example, without limitation, transition metal component can comprise one or more metallocene transition metal components.

Transition metal component can comprise catalyst precursor $ML_aQ_{q-a}$ (wherein M represents transition metal atom of the 4th Group or Lanthanide Series of the Periodic Table of Elements (1991, IUPAC), and examples thereof include transition metals of the 4th Group of the Periodic Table, such as titanium atom, zirconium atom and hafnium atom and transition metals of the Lanthanide Series, such as samarium; L represents group having cyclopentadienyl skeleton or group having at least one hetero atom, at least one L being group having cyclopentadienyl skeleton, and a plurality of L may be the same or different and may be crosslinked to each other; Q represents halide radicals, alkoxide radicals, amide, radicals, and hydrocarbyl radicals having 1 to about 20 carbon atoms; "a" represents a numeral satisfying the expression $0 < a \leq q$; and q represents valence of transition metal atom M).

In L in transition metal component, group having cyclopentadienyl skeleton can comprise, for example, cyclopentadienyl group, substituted cyclopentadienyl group or polycyclic group having cyclopentadienyl skeleton. Example substituted cyclopentadienyl groups include hydrocarbon group having 1 to about 20 carbon atoms, halogenated hydrocarbon group having 1 to about 20 carbon atoms, silyl group having 1 to about 20 carbon atoms and the like. Silyl group according to this invention can include $SiMe_3$ and the like. Examples of polycyclic group having cyclopentadienyl skeleton include indenyl group, fluorenyl group and the like. Examples of hetero atom of the group having at least one hetero atom include nitrogen atom, oxygen atom, phosphorous atom, sulfur atom and the like.

Example substituted cyclopentadienyl groups include methylcyclopentadienyl group, ethylcyclopentadienyl group, n-propylcyclopentadienyl group, n-butyloyclopentabenyl group, isopropylcyclopentadienyl group, isobutylcyclopentadienyl group, secbutylcyclopentadienyl group, tertbutylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group, tetramethyleyclopentadienyl group, pentamethylcyclopentadienyl group and the like.

Example polycyclic groups having cyclopentadienyl group include indenyl group, 4,5,6,7-tetrahydroindenyl group, fluorenyl group and the like.

Example groups having at least one hetero atom include methylamino group, tert-butylamino group, benzylamino group, methoxy group, tert-butoxy group, phenoxy group, pyrrolyl group, thiomethoxy group and the like.

One or more groups having cyclopentadienyl skeleton, or one or more group having cyclopentadienyl skeleton and one or more group having at least one hetero atom, may be crosslinked with (i) alkylene group such as ethylene, propylene and the like; (ii) substituted alkylene group such as isopropylidene, diphenylmetbylene and the like; or (iii) silylene group or substituted silylene group such as dimethylsilylene group, diphenylsilylene group, methylsilylsilylene group and the like.

Q in transition metal component comprises halide radicals, alkoxide radicals, amide radicals, hydrogen radical, or hydrocarbyl radicals having 1 to about 20 carbon atoms. Examples of Q include Cl, F, Br, MeO, EtO, PhO, $C_6F_5O$, BHT, $Me_2N$, $Et_2N$, $Ph_2N$, $(Me_3Si)2N$, alkyl group having 1 to about 20 carbon atoms such as methyl group, ethyl group, n-propyl group, isopropyl group, n-butyl group, benzyl group, silyl groups such as $Me_3Si$, $Ph_3Si$, and the like.

Examples of transition metal component $ML_a Q_{q-a}$, wherein M comprises zirconium, include bis(cyclopentadienyl)zirconium dichloride, bis(methylcyclopentadienyl)zirconium dichloride, bis(pentamethylcyclopentadienyl)zirconiumdimethyl, bis(indenyl)zirconium dichloride, bis(4,5,6,7-tetrahydroindenyl)zirconium dichloride, bis(fluorenyl)zirconium dichloride, ethylenebis(indenyl)zirconium dichloride, dimethylsilylene(cyclopentadienylfluorenyl)zirconium dichloride, diphenylsiylenebis(indenyl)zirconium dichloride, cyclopentadienyldimethylaminozirconium dichloride, cyclopentadienylphenoxyzirconium dichloride, diethyl(tert-butylamino)(tetramethyleyclopentadienyl)silanezirconium dichloride, isopropylidene(cyclopentadienyl)(3-tert-butyl-5-methyl-2-phenoxy)zirconium dichloride, dimethylsilylene(tetramethylcyclopentadienyl)(3-tertbutyl-5-methyl-2-phenoxy)zirconium dichloride, bis(cyclopentadienyl)zirconiumdimethyl, bis(methylcyclopentadienyl)zirconiumdimethyl, bis(pentamethylcyclopentadienyl)zirconiumdimethyl bis(indenyl)zirconiumdimethyl, bis(4,5,6,7-tetrahydroindenyl)zirconiumdimethyl, bis(fluorenyl)zirconiumdimethyl, bis(1-butyl-3-methylcyclopentadienyl)zirconium dimethyl, ethylenebis(indenyl)zirconium dimethyl, dimethylsilylene(cyclopentadienylfluorenyl)zirconiumdimethyl, diphenylsilylenebis(indenyl)zirconiumdimethyl, cyclopentadienyalmethylaminozirconiumdimethyl, cyclopentadienylphenoxyzirconium dimethyl, dimethyl(tert-butylamino)(tetramethylcyclopentadienyl)silanezirconiumdimethyl, isopropylidene(cyclopentadienyl)(3-tert-butyl-5-methyl-2-phenoxy)zirconiumdimethyl, dimethylsilylene(tetramethylcyclopentadienyl)(3-tertbutyl-5-methyl-2-phenoxy)zirconiumdimethyl and the like.

Additional exemplary transition metal components $ML_a Q_{q-a}$ include components wherein zirconium is replaced with titanium or hafnium in the above zirconium components.

Additional exemplary transition metal components $ML_a Q_{q-a}$ include components wherein Q can be the same or different in one molecule.

Other catalyst precursors useful in this invention are: rac-dimethylsilylbis(2-methyl-4-phenyl-indenyl)zirconium dimethyl; rac-dimethylsilylbis(2-methyl-4-phenyl-indenyl)zirconium dichloride (M3); rac-dimethylsilylbis(2-methyl-1-indenyl)zirconium dimethyl; rac-dimethylsilylbis(2-methyl-4,5-benzoindenyl)zirconium dimethyl; rac-ethylenebis(tetrahydroindenyl)zirconium dimethyl; rac-ethylenebis(tetrahydroindenyl)-zirconium dichloride (M4); rac-ethylenebis(indenyl)zirconium dimethyl (M2), rac-ethylenebis(indenyl)zirconium dichloride, bis(1-butyl-3-methylcyclopentadienyl)zirconium dimethyl and bis(1-butyl-3-methylcyclopentadienyl)zirconium dichloride (M1).

Polymerization Using Activator Compositions of this Invention

When using activator compositions of the present invention in polymerization, any olefin or dioelfin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecene-1, eicocene-1, 4-methylpentene-1, 5-methyl-2-pentene-1, vinylcyclohexane, styrene, dicyclopentadiene, norbornene. 5-ethylidene-2-norbomene and the like, but are not limited thereto. In the present invention, copolymerization can be conducted using two or more monomers, simultaneously. Specific examples of the monomers constituting the copolymer include ethylene/an α olefin such as ethylene/propylene, ethylene/butene-1, ethylene/hexene-1, ethylene/propylene/butene-1, ethylene/propylene/5-ethylidene-2-norbornene and the like, propylene/butene-1, and the like, but are not limited thereto.

The polymerization method is not limited, and both liquid phase polymerization method and gas phase polymerization method can be used. Examples of solvent used for liquid phase polymerization include aliphatic hydrocarbons such as butane, pentane, heptane, octane and the like; aromatic hydrocarbons such as benzene, toluene and the like; and hydrocarbon halides such as methylene chloride and the like. It is also possible to use at least a portion of the olefin to be polymerized as a solvent. The polymerization can be conducted in a batch-wise, semibatch-wise or continuous manner, and polymerization may be conducted in two or more stages which differ in reaction conditions. The polymerization temperature can be from about −50° C. to about 200° C. or from 0° C. to about 100° C. The polymerization pressure can be from atmospheric pressure to about 100 kg/cm², or from atmospheric pressure to about 50 kg/cm². Appropriate polymerization time can be determined by means known to those skilled in the art according to the desired olefin polymer and reaction apparatus, and is typically within the range from about 1 minute to about 20 hours. In the present invention, a chain transfer agent such as hydrogen may be added to adjust the molecular weight of olefin polymer to be obtain in polymerization.

This invention also contemplates a polymer produced from the above-described process such as polyolefins and polyolefin copolymers utilizing the monomers described above.

EXAMPLES

The following examples are illustrative of the principles of this invention. It is understood that this invention is not limited to any one specific embodiment exemplified herein, whether in the examples or the remainder of this patent application.

Example 1

0 mol % $C_6H_5CF_3$-No Carbocation Precursor

Comparative

Preparation of Regular Silica Supported MAO (sMAO)

In the drybox, silica (G952 200° C. 4 hr) 24.2 g and toluene 125 g are charged into a 300 mL three-neck round bottom flask equipped with a mechanical stirrer and an oil-bath with heating device. The stirrer is turned on at 400 rpm. MAO solution (Albemarle commercial 30% MAO in toluene, Al=13.6 wt %) 50.0 g (252 mmol Al, bused on 10.4 mmol Al/g silica charge) is added to the silica slurry at ambient. After the addition, the resulting mixture is allowed to stir at ambient for 30 min. The heating device is turned on and set at 110° C. After the oil-batch reaches 110° C., the mixture is allowed to stir at that temperature for 4 hr. The oil-bath is then removed and the reaction mixture is allowed to cool to ambient. The slurry is then filtered, washed with 1×100 g toluene and 2×100 g isohexane and then dried under vacuum for overnight. Yield: 39.3 g, ICP: Al=14.8%. At ambient, the obtained sMAO is re-slurried into 160 g of toluene.

Preparation of Final Catalyst with sMAO

M2 metallocene solid (rac-ethylenebis(indenyl)zirconium dimethyl) 0.58 g (based on 0.35% Zr) is added at once while the slurry is stirred at 400 rpm. After two hours, the resulting orange slurry is filtered, washed with 1×100 g toluene and 2×100 g isohexane, and dried under vacuum for overnight. Yield: 40.0 g. ICP: Al=14.5%; Zr=0.36%. Ethylene polymerization test: 5,700 g/g cat/hr (Minor reactor fouling) (4L autoclave, 50 mg cat, 80° C. 320 PSI, 40 mL 1-hexene, no hydrogen, 2 mL 10% TIBA, 60 min, in isobutane).

Example 2

10 mol % $C_6H_5CF_3$

Comparative

Preparation of Carbocation Agent Treated MAO (CAT-MAO)

In the drybox, MAO solution (Albemarle commercial 30% MAO in toluene, Al=13.6 wt %) 50.0 g (252 mmol Al) is charged in an 8 oz bottle. Under ambient conditions, TMA toluene solution (12.0%) 15.1 g (25.2 mmol Al) was mixed with the MAO solution, following by slowly addition of $C_6H_5CF_3$ toluene solution (9.9%) 12.4 g (25.2 mmol F). The resulting mixture turns to deep blue color and start forming deep blue solids. The deep blue mixture is allowed to stir at ambient for 1 hr, and then heated at 70° C. for 20 min. The deep blue solid remains insoluble and the deep blue color turns into deep green. The mixture is allowed to settle. A small amount of solid is isolated by filtration/washing/drying (difficult to filter) and sent for ICP analysis: Al=41 wt %.

Preparation of Supported CAT-MAO (sCAT-MAO)

Before the 10 mol % CAT-MAO is put on silica, the gem solid is removed by filtration to obtain a green solution. The solution is sampled for both ICP and quantitative $H^1$-NMR analysis: ICP: Al=7.43%; $H^1$-NMR (25° C., 400 mHz, in THF-d8 for MAO and TMA analysis and in $C_6D_6$ for DMAF analysis): Al=7.33% Al, of which 2.70% is from TMA, 0.69% is from $AlMe_2F$ (DMAF), and 3.94% is from modified MAO. The total aluminum lost to solid precipitation is about 2.9 g out of 7.48 g (from MAO+TMA) or 39%. The MAO to TMA molar ratio is now 100:68.5, comparing to the normal MAO: TMA ratio at 100:15. This abnormal modified MAO solution is put on a support anyway.

In the drybox, silica (G948 200° C. 4 hr) 12.1 g and toluene 63 g are charged into a 300 ml, three-neck round bottom flask equipped with a mechanical stirrer and an oil-bath with heating device. The stirrer is turned on at 400 rpm. The green solution (733% Al) 46.4 g (3.4 g Al, based on 10.4 mmol Al/g silica) prepared above is slowly added to the silica slurry under ambient conditions. After the addition, the resulting mixture is allowed to stir at ambient for 30 min. The heating device is turned on and set at 110° C. After the oil-batch reaches 110° C., the mixture is allowed to stir at that temperature for 4 hr. The oil-bath is then removed and the reaction mixture is allowed to cool to ambient.

After the settlement of the solids, the supernate is sampled for ICP analyses: Al=3.6%. The slurry is filtered, washed with 1×50 g toluene and 2×50 g isohexane, and then dried under vacuum for overnight. Yield: 15.10 g. ICP: Al=9.3% (total Al=1.4 g, only 41% Al of the charged 3.4 g Al is put on the support).

Preparation of the Final Catalyst with sCAT-MAO

At ambient, the supported CAT-MAO obtained above is re-slurried into 60 g of toluene. M2 metallocene, solid 0.31 g is added at once while the slurry is stirred at 400 rpm. After two hr, the resulting yellowish-orange slurry is filtered, washed with 1×100 g toluene and 2×100 g isohexane, and dried under vacuum for overnight. Yield: 15.5 g, ICP: Al=9.1%; Zr=0.38%. PE test: 2,800 g/g cat/hr (Serious reactor fouling) (4 L autoclave, 50 mg cat, 80° C. 320 PSI, 40 mL, 1-hexene, no hydrogen, 2 mL 10% TIBA, 60 min, in isobutane).

Example 3

10 mol % $C_6H_5CF_3$

Inventive

Preparation of Silica Supported MAO (sMAO)

In the drybox, silica (G952 200° C. 4 hr) 24.3 g and toluene 125 g are charged into a 300 mL, three-neck round bottom flask equipped with a mechanical stirrer and an oil-bath with heating device. The stirrer is turned on at 400 rpm, MAO solution (Albemarle commercial 30% MAO in toluene, Al 13.6wt %) 50.0 g (252 mmol Al, based on 10.4 mmol Al/g silica charge) is added to the silica slurry at ambient. After the addition, the resulting mixture is allowed to stir at ambient for 30 min. The heating device is turned on and set at 110° C. After the oil-batch reaches 110° C. the mixture is allowed to stir at that temperature for 4 hr. The oil-bath is then removed and the reaction mixture is allowed to cool to ambient. The slurry is then filtered, washed with 1×100 g toluene and 2×100 g isohexane, and then dried under vacuum for overnight. Yield: 39.3 g, ICP: Al=14.9%.

Preparation of Carbocation Agent Treated sMAO (CAT-sMAO)

At ambient, the obtained solid sMAO above is re-slurried into 125 g of toluene. TMA toluene solution (12.0%) 15.0 g (25.0 mmol Al) is mixed with the sMAO slurry, following by slowly addition of $C_6H_5CF_3$ toluene solution (9.9%) 12.3 g (25.0 mmol F). The resulting mixture toms to deep blue color. The mixture is allowed to stir at ambient for 2 hr, and then heated at 70° C. for 20 min to obtain a slurry consisting of a very light yellow supernate and almost colorless solid. A small portion of supernate sample was taken for $H^1$-NMR analysis for quantifying the F uptake. The result shows 7 mol % out of 10 mol % F charge has been nut on the sMAO, a 70% conversion.

Preparation of Final Catalyst Based On CAT-sMAO

M2 metallocene solid 0.58 g is added at once while the slurry is stirred at 400 rpm. After two hr, the resulting orange slurry is filtered, washed with 1×100 g toluene and 2×100 g isohexane, and dried under vacuum for overnight Yield; 39.5 g. ICP: Al=15.2%; Zr=0.36%. PE test: 10,900 g/g cat/hr (Minor reactor fouling) (4 L autoclave, 25 mg cat, 80° C., 320 PSI, 40 mL 1-hexene, no hydrogen, 2 mL 10% TIBA, 60 min, in isobutane).

Example 4

10 mol % $C_6H_5CF_3$

Inventive

Preparation of Silica Supported MAO (sMAO)

In the drybox, silica (G952 200° C. 4 hr) 24.1 g and toluene 125 g are charged into a 300 mL autoclave. The stirrer is turned on at 400 rpm. MAO solution (Albemarle commercial 30% MAO in toluene, Al=13.6 wt %) 50.0 g (252 mmol Al, based on 10.4 mmol Al/g silica charge) is added to the silica slurry at ambient. After the addition, the resulting mixture is allowed to stir at ambient for 30 min. The autoclave is assembled and brought out of the drybox and connected to the controller that monitors the temperature, stirrer rpm, and the reactor internal pressure. The stirrer is turned on and set at 500 rpm and the heating device is turned on and set at 130° C. After it reaches 130° C., the mixture is allowed to stir at that temperature for 4 hr. The heater is then removed and the reaction mixture is allowed to cool to ambient. The autoclave is then brought into the drybox. The reaction mixture was then transferred to a 300 mL three-neck round bottom flask equipped with a mechanical stirrer. The slurry is allowed to settle. A small amount of sample is taken for ICP analysis: Al=3,600 ppm.

Preparation of Carbocation Agent Treated sMAO (CAT-sMAO)

TMA toluene solution (12.0%) 15.0 g (25.0 mmol Al) is mixed with the sMAO slurry under agitation, following by slowly addition of $C_6H_5CF_3$ toluene solution (9.9%) 12.3 g (25.0 mmol F). The resulting mixture turns to a deep blue color. The mixture is allowed to stir at ambient for 2 hr, and then heated at 70° C. for 20 min to obtain a slurry consisting of a very light yellow supernate and almost colorless solid. A small portion of supernate sample was taken for $H^1$-NMR analysis to quantify the F uptake and shows 8 mol % out of 10 mol % is put on silica an conversion.

Preparation of Final Catalyst Based On CAT-sMAO

M2 metallocene 0.58 g solid is added at once while the slurry is stirred at 400 rpm. After two hr, the resulting yellowish-orange slurry is filtered, washed with 1×100 g toluene and 2×100 g isohexane, and dried under vacuum for overnight. Yield: 39.8 g. ICP: Al=17.0%; Zr=0.34%. Ethylene polymerization test: 13,600 g/g cat/hr (No reactor fouling)(4 L autoclave, 25 mg cat, 80° C., 320 PSI, 40 mL 1-hexene, no hydrogen, 2 mL 10% TIBA, 60 min, in isobutane).

Example 5

Non-Bridging Metallocene M1 for PE Applications 10 mol % $C_6H_5CF_3$ (Inventive)

Preparation of Silica Supported MAO (sMAO)

In the drybox, silica (G948 200° C. 4 hr) 9.1 g and toluene 45 g, are charged into a 300 mL, autoclave. The stirrer is turned on at 400 rpm. MAO solution (Albemarle commercial 30% MAO in toluene, Al=13.6 wt %) 21.5 g (108 mmol Al, based on 11.9 mmol Al/g silica charge) is added to the silica slurry at ambient. After the addition, the resulting mixture is allowed to stir at ambient for 30 min. The autoclave is assembled and brought out of the drybox and connected to the controller that monitors the temperature, stirrer rpm, and the reactor internal pressure. The stirrer is turned on and set at 500 rpm and the heating device is turned on and set at 130° C. After it reaches 130° C. the mixture is allowed to stir at that temperature for 4 hr. The heater is then removed and the reaction mixture is allowed to cool to ambient. The autoclave is then brought into the drybox. The reaction mixture was the transferred to a 300 mL three-neck round bottom flask equipped with a mechanical stirrer. The slurry is allowed to settle. A small amount of sample is taken for ICP analysis: Al=1200 ppm.

Preparation of Carbocation Agent Treated sMAO (CAT-sMAO)

TMA toluene solution (12.0%) 6.0 g (10.0 mmol Al) is mixed with the sMAO slurry obtained above under agitation, following by slowly addition of $C_6H_5CF_3$ toluene solution (9.9%) 4.91 g (10.0 mmol F). The resulting mixture turns to a deep blue color. The mixture is allowed to stir at ambient for 2 hr, and then heated at 70° C. for 20 min to obtain a slurry consisting of a very light yellow supernate and almost colorless solid. A small portion of supernate sample was taken for $H^1$-NMR analysis to quantify the F uptake and shows 8 mol % out of 10 mol % is put on silica, an 80% conversion.

Preparation of Final Catalyst Based on CAT-sMAO

M1 metallocene (bis(1-butyl-3-methylcyclopentadienyl) zirconium dichloride) solution in toluene (19.6%) 1.73 g is added at once while the slurry is stirred at 400 rpm. After two hr, the resulting yellowish-orange slurry is filtered, washed with 1×50 g toluene and 2×50 g isohexane, and dried under vacuum for overnight. Yield: 15.6. ICP: Al=18.1%; Zr=0.45%, Ethylene polymerization test: 5,700 g/g, cat/hr (No reactor fouling) (4 L autoclave, 50 mg cat, 85° C., 320 PSI, 50 mL 1-hexene, no hydrogen, 1 mL 10% TIBA, 60 min, in isobutane).

Example 6

0 mol % $C_6H_5CF_3$

Comparative

Preparation of Silica Supported MAO (sMAO)

In the drybox, silica (G948 200° C. 4 hr) 24.1 g and toluene 125 g are charged into a 300 mL three-neck round bottom flask equipped with a mechanical stirrer and an oil-bath with heating device. The stirrer is turned on at 400 rpm. MAO solution (Albemarle commercial 30% MAO in toluene, Al=13.6 wt %) 56.9 g (287 mmol Al, based on 11.9 mmol/g silica) is added to the silica shiny at ambient. After the addition, the resulting mixture is allowed to stir at ambient for 30 min. The heating device is turned on and set at 130° C. After the oil-batch reaches 130° C. the mixture is allowed to stir at that temperature for 4 hr. The oil-bath is then removed and the reaction mixture is allowed to cool to ambient. The slurry is then filtered, washed with 1×100 g toluene and 2×100 g isohexane, and then dried under vacuum for overnight. Yield: 39.1 g. ICP: Al=17.9%. At ambient, the obtained sMAO is re-slurried into 160 g of toluene.

Preparation of Final Catalyst Based on CAT-sMAO

M1 metallocene solution in toluene (19.6%) 4.33 g (based on 0.45% Zr) is added at once while the slurry is stirred at 400 rpm. After two hr, the resulting orange slurry is filtered, washed with 1×100 g toluene and 2×100 g isohexane, and dried under vacuum for overnight. Yield: 39.8 g. ICP: Al=17.5%; Zr=0.46%. Ethylene polymerization test: 3,500 g/g cat/hr (No reactor fouling) (4 L autoclave, 50 mg, cat, 85° C., 320 PSI, 50 mL 1-hexene, no hydrogen, 2 mL 10% TIBA, 60 min, in isobutane).

Example 7

Silicon-Bridged Metallocene M3 for PP Applications 10 mol % $C_6H_5CF_3$ (Inventive)

Preparation of Silica Supported MAO (sMAO)

In the drybox, silica (Fuji P-10 100° C. 8 hr) 20.3 g and toluene 70 g are charged into a 300 mL autochive. The stirrer is turned on at 400 rpm. MAO solution (Albemarle commercial 30% MAO in toluene, Al=13.6 wt %) 48.5 g (244 mmol Al, based on 12.0 mmol Al/g silica) is added to the silica slurry at ambient. After the addition, the resulting mixture is allowed to stir at ambient for 30 min. The autoclave is assembled and brought out of the drybox and connected to the controller that monitors the temperature, stirrer rpm, and the reactor internal pressure. The stirrer is turned on and set at 500 rpm and the heating device is turned on and set at 130° C. After it reaches 130° C., the mixture is allowed to stir at that temperature for 4 hr. The heater is then removed and the reaction mixture is allowed to cool to ambient. The autoclave is then brought into the drybox. The reaction mixture was then transferred to a 300 mL three-neck round bottom flask equipped with a mechanical stirrer. The slurry is allowed to settle. A small amount of sample is taken for ICP analysis: Al=900 ppm.

The slurry is shaken well, and 4.0 g slurry is taken and filtered, washed with 3×10 g isohexane and dried under vacuum to constant weight. The yield is 1.04 g, which indicates that the slurry has a sMAO percentage 26.0%. The solid was sampled for ICP: Al=18.44%. The sMAO slurry is divided into two portions; one for the carbocation agent modified version and one for a regular supported MAO version for comparisons (Example 8).

Preparation of Carbocation Agent Treated sMAO (CAT-sMAO)

82.7 g sMAO slurry (Al=147 mmol) is charged to a 300 mL three-neck round bottom flask equipped with a mechanical stirrer. The slurry is heated to 70° C. in an oil-bath under agitation. TMA toluene solution (20.0%) 6.4 g (17 mmol Al) is added to the sMAO slurry, following by slowly addition of $C_6H_5CF_3$ toluene solution (9.9%) 7.3 g (14.8 mmol F). The resulting mixture turns to a deep blue color. The mixture is allowed to stir at 70° C. 15 min, and then reduces the temperature to 35° C. for 1 hr 45 min to obtain a slimy consisting of a light greenish-yellow supernate and a green solid. A small portion of supernate sample was taken for $H^1$-NMR analysis to quantify the F uptake and shows 8 mol % out of 10 mol % is put on silica, an 80% conversion.

Preparation of Final Catalyst Based on CAT-sMAO

M3 metallocene solid (rac-dimethylsilylbis(2-methyl-4-phenyl-indenyl)zirconium dichloride) 0.25 g is added at once while the slurry is stirred at 400 rpm. After two hr, the resulting red slurry is filtered, washed with 1×100 g toluene and 2×100 g isohexane, and dried under vacuum for 4 hr. Yield: 21.3 g. ICP: Al=18.5%; Zr=0.18%. Propylene polymerization test: 34,000 g/g cat/hr (No reactor fouling)(4 L autoclave, 14 mg cat, 70° C., 2200 mL propylene, 50 mL×18.0 PSI $H_2$, 1 mL 5% TIBA, 60 min).

Example 8

0 mol % $C_6H_5CF_3$

M3 Comparative

Preparation of Silica Supported MAO (sMAO)

44.2 g sMAO slurry (Al=78.5 mmol) from Example 7 is charged to a 300 mL three-neck round bottom flask equipped with a mechanical stirrer. M3 metallocene solid 0.080 g is added at once while the slurry is stirred at 400 rpm. After two hr, the resulting red slurry is filtered, washed with 1×50 g toluene and 2×50 g isohexane, and dried under vacuum for 4 hr. Yield: 11.3 g. ICP: Al=18.3%; Zr=0.19%. Propylene polymerization test: 10,800 g/g cat/hr (No reactor fouling) (4 L autoclave, 14 mg cat, 70° C., 2200 mL propylene, 50 mL×180 PSI $H_2$, 1 mL 5% TIBA, 60 min).

Example 9

3 mol % Butene Oxide Carbocation Agent

Inventive

MAO (30% in toluene, Albemarle product) 12.67 g (Al=64.5 mmol) was placed in a 20 mL vial. Neat butene oxide (or 1,2 epoxybutane, 99%, Aldrich) 0.14 g (1.9 mmol) was then slowly added to the MAO solution at ambient. The resulting solution was allowed to shake on a shaker for over night.

The solution above was tested for M2 catalyzed 1-hexene polymerization using a simple calorimetry method to quantify the heat of reaction released by the polymerization process that forming two C—C single bonds (releasing 2×~83=166 kcal/mol heat) while breaking one C=C double bond (absorbing ~146 kcal/mol heat that gives a net heat release of about 20 kcal/mol 1-hexene. Under the same conditions, the higher the heat of reaction, the more active the catalyst system. The calorimetric measurement was done in a double-jacked 50 mL round-bottom reactor equipped with a stirring bar and a thermal couple for temperature measurement. Dry toluene 17.115 g and M2 toluene solution 0.5482 g made from the stock solution of 0.111 g solid M2 in toluene 10.0 g were charged into the reactor. The stirrer was turned on. Then the treated MAO 0.326 g based on Al:Zr=100:1 was charged into the reactor and a stopwatch was turn on to count the activation time. After 15 min (lap 1) the solution temperature was recorded as 28.0° C., and 0.60 g 1-hexene was injected to the solution while the stopwatch was turned on (lap 2). The temperature started to rise and after 5 min (lap 2), a temperature of 41.9° C. was recorded. The heat of reaction was calculated as 18.66 kcal/g cat/5 min.

A baseline run based on non-treated MAO was also one to see the difference from the treated MAO. Dry toluene 17.11 g and M2 solution 0.5292 g from the same M2 stock solution were charged into the reactor. The stirrer was turned on. Then the non-treated MAO (0.328 g) based on Al:Zr=100:1 was charged into the reactor and a stopwatch was turn on to count the activation time. After 15 min (lap 1), the solution temperature was recorded as 28.3° C., and 0.60 g 1-hexene was injected to the solution while the stopwatch was turned on (lap 2). The temperature started to rise and after 5 min (lap 2), a temperature of 37.0° C. was recorded. The heat of reaction was calculated as 12.8 kcal/g cat/5 min.

The baseline for Al:Zr=200:1 was also run and a heat of reaction of 22.4 kcal/g cat/5 min was obtained. Therefore, it can be seen that the boost is very significant through the 3 mol % butene oxide treatment of MAO. It can be seen that with treated MAO at Al:Zr=100:1, the performance is closer to the performance of a non-treated MAO at Al:Zr=200:1.

Example 10

6 Mol % Methyl-tert-Butylether Carbocation Agent

Inventive sMAO is made from the procedures the same as in Example 7. The sMAO slurry is determined containing 19.6% sMAO and the Al on the sMAO solid is 18.0%. The sMAO slurry is divided into two portions; one for the carbocation agent modified version and one for a regular supported MAO version for comparisons (Example 11).

12.5 g sMAO slurry (Al=16.0 mmol) is charged to a 20 mL vial. TMA toluene solution (12.0%) 0.9 g (1.5 mmol Al) is added to the sMAO slurry, following by slowly addition of the toluene solution of 0.085 g of methyl-tert-butylether (MTBE, Aldrich) in 1 g of toluene (0.96 mmol) with hand shaking during the addition. The mixture is allowed to shake on a shaker for 1 hr. A small portion of supernate sample was taken for $H^1$-NMR. No MTBE is detected, and the tBu of MTBE has been converted to either neopentane or isobutene, and the methoxy group of MTBE is non-detectable.

M4 metallocene solid (rac-ethylenebis(tetrahydroindenyl) zirconium dichloride) 0.035 g is added at once while the slurry is stirred at 400 rpm. After two hr, the resulting red slurry is filtered, washed with 1×10 g toluene and 2×10 g isohexane, and dried under vacuum for 4 hr. Yield: 2.45 g, ICP: Al=17.5%; Zr=0.41%. Ethylene polymerization test: 13,900 g/g cat/hr No reactor fouling)(4 L autoclave, 25 mg cat, 80° C., 320 PSI, 40 mL 1-hexene, 2 mL 10% TIBA, 60 min, in isobutane).

Example 11

0 mol % Methyl-tert-Butylether

Comparative 13.5 g sMAO slurry (from Example 10) is charged to a 20 mL vial. M4 metallocene solid 0.037 g is added at once while the slurry is stirred at 400 rpm. After two hr, the resulting red slurry is filtered, washed with 1×10 g toluene and 2×10 g isohexane and dried under vacuum for 4 hr. Yield: 2.65 g, ICP: Al=17.8%; Zr=0.40%. Ethylene polymerization test: 8,400 g/g cat/hr (No reactor fouling)(4 L autoclave, 25 mg cat, 80° C., 320 PSI 40 mL 1-hexene, 2 mL 10% TIBA, 60 min, in isobutane).

Example 12

10 mol % N,N-dimethylbenzylamlne

Inventive

Preparation of Silica Supported MAO (sMAO)

19.4 lbs of Fuji P-10 silica (26 micron) calcined at 150° C. for 7.5 hr with an LOD of 0.84% (300° C. 4 hr under $N_2$) was charged in a 10 galon reactor with toluene 107.4 lbs to form slurry. At ambient (about 25° C.), MAO 30% solution (Al=15.58%, Albemarle product) 44.5 lbs based on 11.5 mmol Al/g silica were added slowly with control of the internal temperature not exceeding 30° C. 7.0 lbs of toluene was used to rinse residual MAO. The mixture was allowed to agitate at ambient for 30 min. The temperature was then increased to 130° C. and maintained for 4 hrs. A small sample was filtered, washed, and dried to obtain the solid and determine that the solid in the slurry is 21.38% and the Al in the neat solid is 18.5%.

Preparation of Carbocation Agent Treated sMAO (CAT-sMAO)

16.8 g of supported MAO slurry (containing 3.59 g solid) from above was charged in a 20 mL vial. To the vial at once was added $AlMe_3$ toluene solution (15.5%, as Component III $AlR_3$) 1.14 g containing neat $AlMe_3$ 2.45 mmol, based on 10 mol % of Al on the sMAO solid. While the vial was vigorously shaken, 0.33 g of neat $Me_2NCH_2C_6H_5$ (N,N-dimethylbenzylamine), as component II was slowly added to the mixture of sMAO and $AlMe_3$. The reaction mixture was allowed to agitate on a shaker for 2 hr.

Preparation of Final Catalyst Based on CAT-sMAO

To the amine carbocation treated sMAO mixture prepared above was then added 0.052 g of Rac-Ethylenebis(indenyl) zirconium dimethyl (M2) followed by shaking on a shaker for 1 hr. The mixture was then filtered, washed with 2×10 g toluene and 2×15 g isohexane, and dried under vacuum for 2 hr. Yield: 3.56 g. (ICP Al=183%; Zr=0.35%) The ethylene polymerization tests were done under conditions similar to Example 1 (4 L autoclave, 30 mg oat, 80° C., 320 PSI, 40 mL 1-hexene, no hydrogen, 1 mL 10% TIBA, 60 min, in isobutane) and the results are listed in Table 1 under Example 12.

Example 13

0 mol % N.N-dimethylbenzylamine

Comparative 15.2 g of supported MAO slurry (containing 3.25 g solid) from Example 12 was charged in a 20 mL vial. To the supported MAO was added M2 metallocene (0.054 g), following by shaking on a shaker for 1 hr. The mixture was then filtered, washed with 2×10 g toluene and 2×15 g isohexane, and dried under vacuum for 2 hr. Yield: 3.18 g. (ICP Al=18.8%; Zr=0.39) The ethylene polymerization tests were done under conditions similar to Ex. 1 (4 L autoclave, 30 mg cat, 80° C. 320 PSI, 40 mL 1-hexene, no hydrogen 1 mL 10% TIBA, 60 min, in isobutane) and the results are listed in Table 1 as Entry 13.

TABLE 1

SUMMARY OF EXAMPLES

| Example | Carbocation Comp II | TMA Comp III | AO Intermediate Comp I | Metallocene | PE/PP Test g/gcat/hr | Reactor Fouling |
|---|---|---|---|---|---|---|
| 1 Comparative | — | No | Yes | M2 | 5,700 (PE) | Minor |
| 2 Comparative | 10 mol % $C_6H_5CF_3$ | Yes | No | M2 | 2,800 (PE) | Serious |
| 3 Inventive | 10 mol % $C_6H_5CF_3$ | Yes | Yes | M2 | 10,900 (PE) | Minor |
| 4* Inventive | 10 mol % $C_6H_5CF_3$ | Yes | Yes | M2 | 13,600 (PE) | No |
| 5 Inventive | 10 mol % $C_6H_5CF_3$ | Yes | Yes | M1 | 5,700 (PE) | No |
| 6 Comparative | — | No | Yes | M1 | 3,500 (PE) | No |
| 7 Inventive | 10 mol % $C_6H_5CF_3$ | Yes | Yes | M3 | 34,000 (PP) | No |
| 8 Comparative | — | No | Yes | M3 | 10,800 (PP) | No |
| 9 Inventive | 3 mol % butene oxide | Yes | no | — | — | — |

TABLE 1-continued

SUMMARY OF EXAMPLES

| Example | Carbocation Comp II | TMA Comp III | AO Intermediate Comp I | Metallocene | PE/PP Test g/gcat/hr | Reactor Fouling |
|---|---|---|---|---|---|---|
| 10 Inventive | 6 mol % methyl t-butyl ether | Yes | Yes | M4 | 13,900 (PE) | No |
| 11 Comparative | — | No | Yes | M4 | 8,400 (PE) | No |
| 12 Inventive | 10 mol % Me$_2$NCH$_2$C$_6$H$_5$ | Yes | Yes | M2 | 11,000 (PE) | No |
| 13 Comparative | — | No | Yes | M2 | 7,400 (PE) | No |

*Example 4 sMAO prepared at 130° C. vs. 110° C. for Example 3

Comparative Example 2 and Inventive Example 3 shows that when aluminoxane is first reacted with the carbocation precursor, the catalyst activation is about 3 times less than the inventive example where the supported AO intermediate is first formed, then reacted with the carbocation precursor.

The invention claimed is:

1. A composition comprising:
   (i) a supported aluminoxane intermediate composition prepared by:
      a) a support; b) an organoaluminum compound; and c) an oxygen source
   (ii) a compound having the formula R$^1$(X)$_n$; wherein R$^1$ is a hydrocarbyl group having from about 1 to about 20 carbon atoms; n is from 1 to the number of possible substitutions of the hydrocarbyl group and each X are optionally substituted on R$^1$ and is independently halogen, —OSi(R$^2$)$_3$, —N(Si(R$^2$)$_3$)$_2$, —N(R$^2$)$_2$; —SR$^2$; —P(R$^2$)$_2$; —CN, or —OR$^3$; wherein each R$^2$ is independently hydrogen or a hydrocarbyl group having from about 1 to about 20 carbon atoms; each R$^3$ is independently a hydrocarbyl having from 1 to 20 carbon atoms, wherein when at least one R$^2$ is a hydrocarbyl group; R$^1$ and R$^2$ or R$^1$ and R$^3$ are optionally linked together to form a cyclic group; provided that at least one X is not directly bonded to an aryl group, and provided that when X is not halogen, X is bonded to a secondary or tertiary carbon, or a —CH$_2$-aryl group; and
   (iii) a trihydrocarbylaluminum compound having the formula AlR$_3$, wherein each R is independently a C$_1$-C$_{20}$ hydrocarbyl group.

2. The composition of claim 1, wherein R is C$_1$-C$_8$ alkyl, R$^1$ is a C$_3$-C$_8$ alkyl or C$_7$-C$_{15}$ aralkyl, n is 1 to 3, X is halogen or —OR$^2$, and R$^2$ is a C$_1$-C$_4$ alkyl or C$_6$-C$_{15}$ aralkyl.

3. The composition of claim 1, wherein R$^1$(X)$_n$ is (R$^4$)$_3$C—OR$^5$ or (R$^4$)$_3$C—N(R$^5$)$_2$; wherein each R$^4$ is independently a hydrogen or a hydrocarbyl group having from about 1 to about 20 carbon atoms and at least one R$^4$ is a hydrocarbyl group; R$^5$ is a hydrocarbyl group having from about 1 to about 20 carbon atoms; or R$^4$ and R$^5$ are optionally linked together to form a cyclic group.

4. The composition of claim 1, wherein R$^1$(X)$_n$ is: Me$_3$CF, Me$_3$SiF, C$_6$H$_5$CH$_2$F, C$_6$H$_5$CF$_3$ 1,3-C$_6$H$_4$(CF$_3$)$_2$, $^t$Bu-OMe, 1,2-($^t$BuO)$_2$C$_6$H$_4$; 1,3-($^t$BuO)$_2$C$_6$H$_4$; 1,4-($^t$BuO)$_2$C$_6$H$_4$; $^t$BuO—CH$_2$—CH$_2$—O$^t$Bu; 1-methyl-tetrahydrofuran, 1,2-dimethyl-tetrahydrofuran or mixtures thereof, wherein C$_6$H$_4$ is a phenylene group and $^t$Bu is a tertiary-butyl group.

5. The composition of claim 1, wherein R$^1$(X)$_n$ is, tertiary-butyl methyl ether, tertiary-butyl ethyl ether, tertiary-butyl propyl ether, tertiary-butyl butyl ether, 1-tert-butoxy-2,6-di-tert-butylbenzene, 1-trimethylsiloxy-2,6-di-tert-butylbenzene, trimethylsiloxybenzene, trimethylmethoxysilane, benzylmethyl ether, benzyl ethyl ether, benzylpropyl ether, benzyl butyl ether or mixtures thereof.

6. The composition of claim 1, wherein R$^1$(X)$_n$ is ethylene oxide, propylene oxide, isobutene oxide, 1-butene oxide, styrene oxide, 4-methyl-styrene oxide, 2,2-dimethyl-trimethylene oxide, 2,2-diphenyl-trimethylene oxide, 1-methyl-ethyleneimine, 1,1,2-trimethylethylenimine, 1,1-diphenyl-2-methyl-ethylenimine, 1-methyl-tetrahydro-pyrrole, 1,1,2-trimethyl-tetrahydro-pyrrole, 1,1-diphenyl-2-methyl-tetrahydro-pyrrole, 1-methyl-piperidine, 1,1,2-trimethyl-piperidine, 1,1-diphenyl-2-methyl-piperidine, or mixtures thereof.

7. The composition of claim 1, wherein the aluminoxane on a support comprises methylaluminoxane, neopentylaluminoxane, benzylaluminoxane, ethylaluminoxane, n-butylaluminoxane, or isobutylaluminoxane.

8. The composition of claim 1, wherein the trihydrocarbylaluminum compound is trimethylaluminum, trineopentylaluminum, tribenzylaluminum, triethylaluminum, tripropylaluminum, tributylaluminum, triisobutylaluminum, tri-n-octylaluminum or mixtures thereof.

9. The composition of claim 1, wherein the support is silica, alumina, silica-alumina, clay, a modified clay composition, or any combination thereof.

10. The composition of claim 1, wherein the mole ratio of the compound of formula R$^1$(X)$_n$ to the trihydrocarbylaluminum compound is about 0.01:1 to 2:1 and the mole ratio of X in the compound of formula R$^1$(X)$_n$ to Al in the supported aluminoxane is about 0.01:1 to 0.8:1.

11. The composition of claim 1, further comprising a transition metal component.

12. A composition comprising:
   (i) a trihydrocarbylaluminum compound having the formula AlR$_3$, wherein each R is independently a C$_1$-C$_{20}$ alkyl;
   (ii) a compound having the formula R$^1$(X)$_n$; wherein R$^1$ is a hydrocarbyl group having from about 3 to about 20 carbon atoms; n is from 1 to the number of possible substitutions of the hydrocarbyl group and each X are optionally substituted on R$^1$ and is independently, —OSi(R$^2$)$_3$, —N(Si(R$^2$)$_3$)$_2$, —N(R$^2$)$_2$; —SR$^2$; —P(R$^2$)$_2$; —CN, or —OR$^3$; wherein each R$^2$ is independently hydrogen or a hydrocarbyl group having from about 1 to about 20 carbon atoms;
   each R$^3$ is independently a hydrocarbyl having from 1 to 20 carbon atoms, wherein when at least one R$^2$ is a hydrocarbyl group; R$^1$ and R$^2$ or R$^1$ and R$^3$ are optionally linked together to form a cyclic group; provided that at least one X is not directly bonded to an aryl group, and provided that X is bonded to a secondary or tertiary carbon, or a —CH$_2$-aryl group; and
   (iii) an aluminoxane.

13. The composition of claim 12, wherein R is $C_1$-$C_8$ alkyl, $R^1$ is a $C_3$-$C_8$ alkyl or $C_7$-$C_{15}$ aralkyl, n is 1 to 3, X is —$OR^2$, and $R^2$ is a $C_1$-$C_4$ alkyl or $C_6$-$C_{15}$ aralkyl.

14. The composition of claim 12, wherein $R^1(X)_n$ is $(R^4)_3C$—$OR^5$ or $(R^4)_3C$—$N(R^5)_2$; wherein each $R^4$ is independently a hydrogen or a hydrocarbyl group having from about 1 to about 20 carbon atoms and at least one $R^4$ is a hydrocarbyl group; $R^5$ is a hydrocarbyl group having from about 1 to about 20 carbon atoms; or $R^4$ and $R^5$ may be linked together to form a cyclic group.

15. The composition of claim 12, wherein $R^1(X)_n$ is $^tBu$-OMe, 1,2-$(^tBuO)_2C_6H_4$; 1,3-$(^tBuO)_2C_6H_4$; 1,4-$(^tBuO)_2C_6H_4$; $^tBuO$—$CH_2$—$CH_2$—$O^tBu$; 1-methyl-tetrahydrofuran, 1,2-dimethyl-tetrahydrofuran or mixtures thereof, wherein $C_6H_4$ is a phenylene group and $^tBu$ is a tertiary-butyl group.

16. The composition of claim 12, wherein the mole ratio of the compound of formula $R^1(X)_n$ to the trihydrocarbylaluminum compound is about 0.01:1 to 0.1:1 and the mole ratio of X in the compound of formula $R^1(X)_n$ to Al in the non-supported solution aluminoxane is about 0.01:1 to 0.8:1.

17. The composition of claim 12, further comprising a carrier.

18. The composition of claim 12, further comprising a transition metal component.

* * * * *